United States Patent [19]

Tella et al.

[11] Patent Number: 4,852,242

[45] Date of Patent: Aug. 1, 1989

[54] TOOL COUPLING APPARATUS AND METHOD

[75] Inventors: Richard P. Tella, Sunnyvale, Calif.; Stuart D. Lerner, Evanston, Ill.

[73] Assignee: Hewlett-Packard Company, Palo Alto, Calif.

[21] Appl. No.: 172,611

[22] Filed: Mar. 24, 1988

[51] Int. Cl.[4] .................. B23Q 3/155; B25J 15/04
[52] U.S. Cl. ........................... 29/568; 279/79; 403/329; 403/381; 901/39; 901/41
[58] Field of Search ............ 29/568; 279/1 TS, 76, 279/79; 901/31, 39, 41; 403/321, 322, 324, 381, DIG. 4

[56] References Cited

U.S. PATENT DOCUMENTS

| | | | |
|---|---|---|---|
| 4,281,447 | 8/1981 | Miller et al. | 29/568 |
| 4,543,032 | 9/1985 | Leverett et al. | 901/31 X |
| 4,601,637 | 7/1986 | Aviles et al. | 901/39 X |
| 4,650,256 | 3/1987 | Wetzinger | 403/381 X |
| 4,660,274 | 4/1987 | Goumas et al. | 901/31 X |
| 4,676,142 | 6/1987 | McCormick et al. | 92/130 |

OTHER PUBLICATIONS

Goumas, Peter G., "A Universal Gripper for Small Parts Assembly", publ. by Lord Corporation, LL-1202, Cary, N.C.
Honeywell Corporate Systems, "Intelligent Task Automation Interim Technical Report", Report No. II-4, Dec. 1987.
Monforte Robotics, Inc., "Foreman Tool-Changing Robot Hands" (brochure).
Document, "Cybervision III, Robotic Assembly System".
R. C. Luo, "An Automatic Quick-Change Gripper Finger for Assembly Automation", pp. 266–267.

Primary Examiner—Steven C. Bishop

[57] ABSTRACT

A coupling mechanism permits a robot hand to be coupled to, and uncoupled from, application-specific tools by the motion of the robotic hand relative to a tool stand.

11 Claims, 3 Drawing Sheets

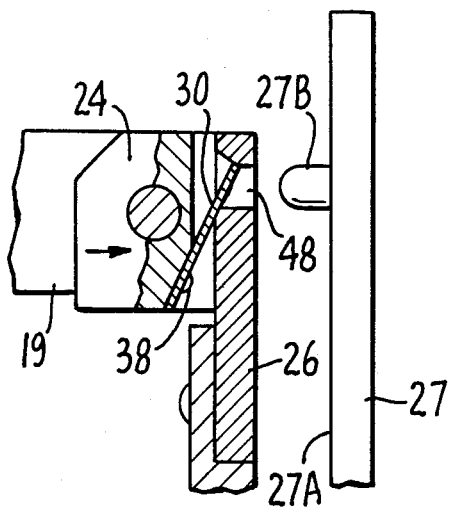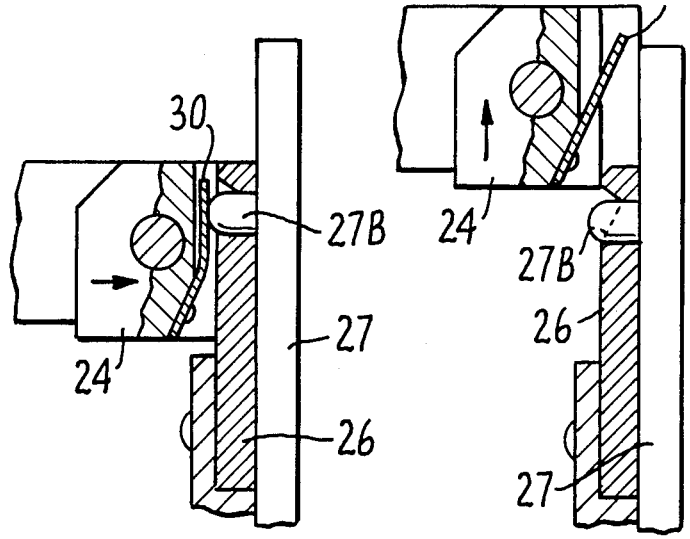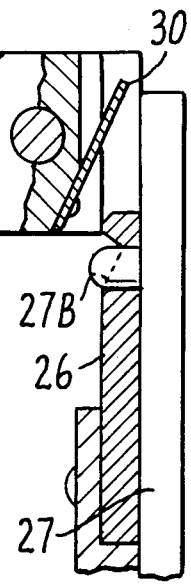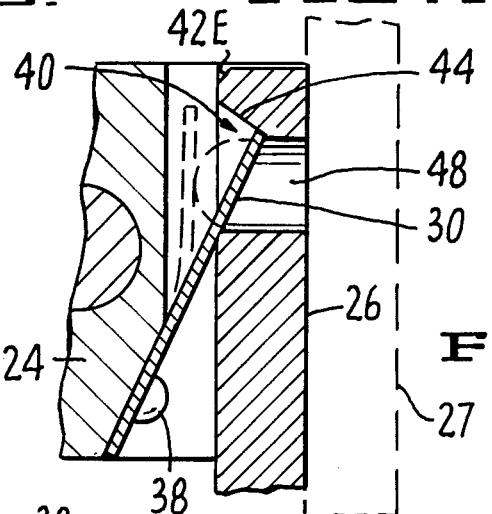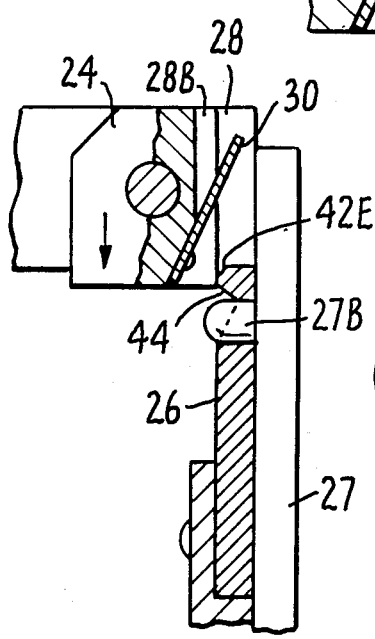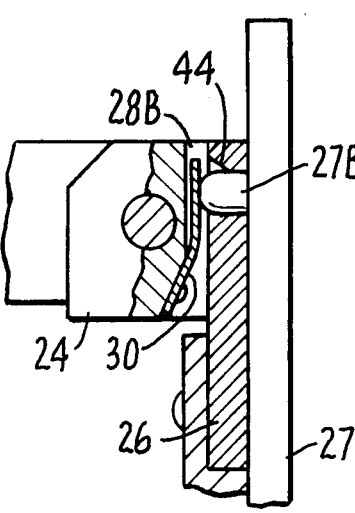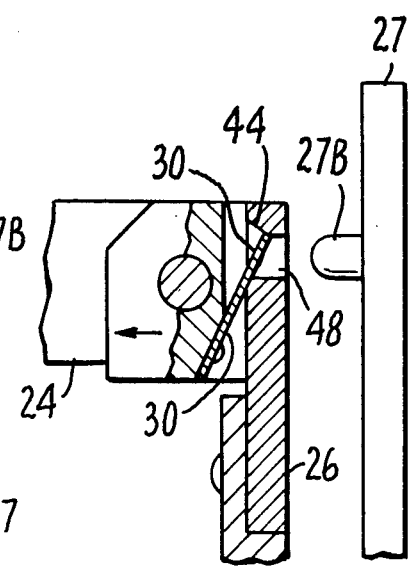

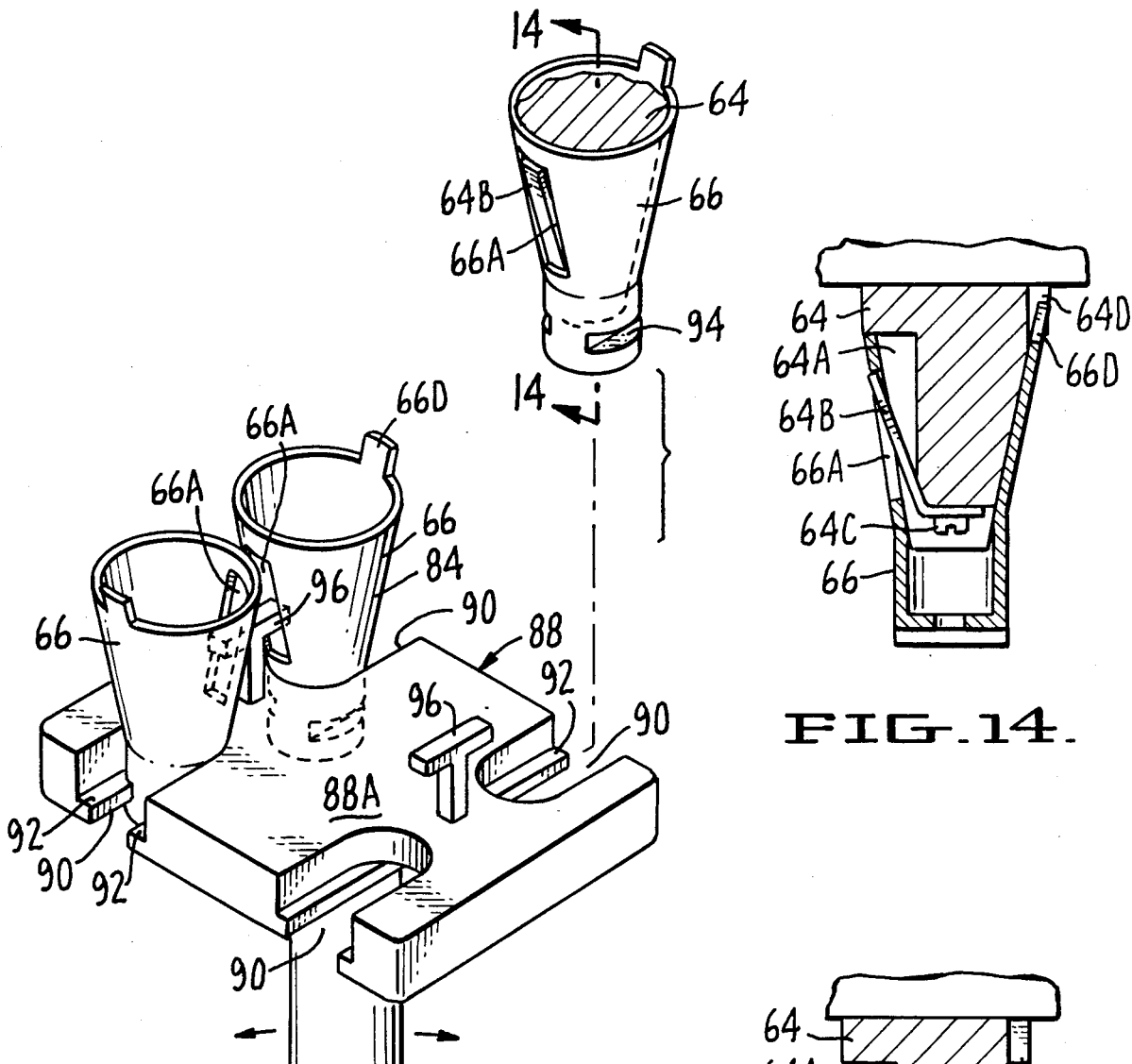
FIG.14.
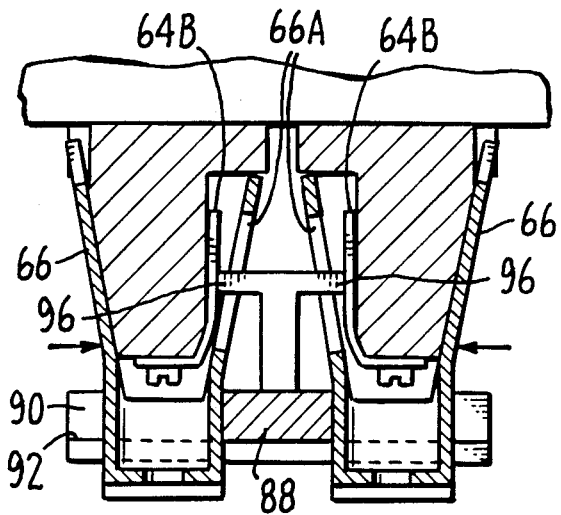
FIG.13.
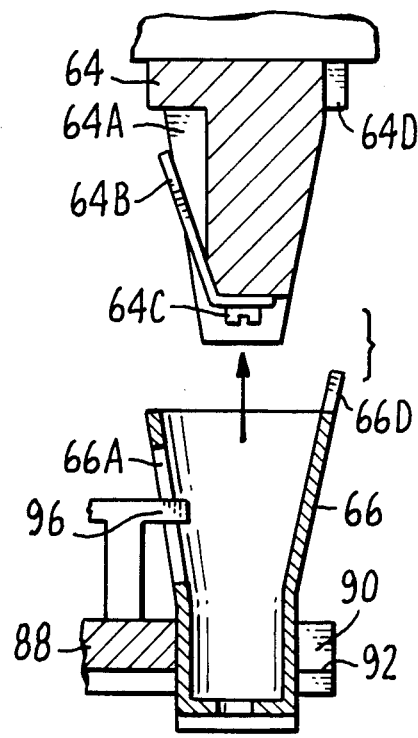
FIG.15.
FIG.16.

TOOL COUPLING APPARATUS AND METHOD

BACKGROUND OF THE INVENTION

1. Field of the Invention

The present invention generally relates to robotics and, more specifically, to systems for coupling and decoupling tools from robotic hands.

2. Description of the Prior Art

Robots are widely used in the field of automated manufacturing and material handling. Pursuant to such uses, there exists a need for robots to grasp various objects and tools. For example, when assembling circuit boards in automated operations, it is highly desirable that a robotic hand be able to sequentially grasp a first tool, then a second tool, and so forth. As another example, in automated laboratory operations, it is desirable that a robot be able to exchange tools which are adapted to specific tasks, such as for retrieving articles from centrifuges or for operating devices such as syringes.

The ability of a robot to interchangeably use a number of different tools can be referred to as "tool interchangeability". Generally speaking, the benefit of tool interchangeability are that a single robot can be used flexibly and that the need for multiple robots is minimized. Although it is known to provide mechanisms that provide robots with the ability to exchange tools without human assistance, such mechanisms have had drawbacks including complexity and cost. One example of an interchanging mechanism is set forth in U.S. Pat. No. 4,676,142, entitled "Adapter With Modular Components for a Robot End-of-Arm Interchangeable Tooling System."

The difficulties in designing mechanisms that provide robots with the ability to exchange tools can be appreciated by contrasting the capabilities of human hands with the capabilities of typical robotic systems. For example, a human worker can usually easily pick up a dropped tool; by way of contrast, even a robotic system that is equipped with machine vision often cannot identify a dropped tool, let alone retrieve it. Thus, in designing systems that provide tool interchangeability for robots, attention must be paid to features that prevent dropping of tools. Specifically, systems must be designed to provide tool mechanisms that reliably lock interchangable tools to robotic hands so that the tools will not normally unlatch while working but can be readily coupled and decoupled when interchanging tools.

Further, it can be appreciated that the risks of a robot inadvertently dropping a tool are greatest when a robotic hand attempts to grasp a tool (as during tool coupling) and when a robotic hand attempts to exchange tools (or during tool decoupling). In other words, the risks of dropped tools are greatest just before, or just after, a robotic hand latches to a tool. During such periods, errors in positioning the robotic hand can cause a tool to be inadvertently dropped.

The above-described difficulties in designing mechanisms that provide robots with capability to easily and reliably interchange tools are especially acute when the tools are small. Small-scale tools are required, for example, when circuit packages of the surface mounted type are assembled onto printed circuit boards. Also, small tools are often required when a robotic hand is to operate in a chemical or biology laboratory.

SUMMARY OF THE INVENTION

In view of the preceding discussion, it can be appreciated that there exists a need to provide a system for interchangeably coupling tools to a robotic hand using a simple but reliable mechanism which accommodates some degree of mispositioning and misalignment of the robotic hand and the interchangeable tools. More particularly, there exists a need for systems that exchangeably couple tools to robotic hand by a coupling mechanism which is self-aligning to minimize the inadvertent dropping of tools.

In accordance with the preceding objects, a coupling system according to the present invention generally provides a tapered receiver connected to a robotic hand to receive a tool connector fixed to a tool. More particularly, the tool connector has a tapered portion complementary in shape to the tapered receiver so that the two can be self-centeringly mated by simple motion of the robotic hand. In the preferred embodiment, the coupling system includes a latching mechanism employing a leaf spring that interactively latches the tapered receiver to the tapered tool connector such that the latching mechanism can be activated by simple motion of the robotic hand.

Details of the preferred embodiment of the present invention are set forth in the following description and attached drawing.

BRIEF DESCRIPTION OF THE DRAWING

FIGS. 6, 7 and 8 are sequential views, drawn to an enlarged scale for purposes of clarity, showing a series of steps in operation of the system of FIG. 1;

FIG. 9 is a view similar to FIG. 6, but further enlarged for purposes of clarity;

FIGS. 10, 11 and 12 are sequential views that further illustrate a series of steps in operation of the system of FIG. 1;

FIG. 13 is a perspective view of an alternate embodiment of a system according to the present invention;

FIG. 14 is an enlarged partial section taken along lines 14—14 in FIG. 13 for viewing in the direction of the arrows;

FIG. 15 is an elevational section similar to FIG. 14; and

FIG. 16 is an elevational section similar to FIG. 15.

DESCRIPTION OF THE PREFERRED EMBODIMENTS

Figure 1:
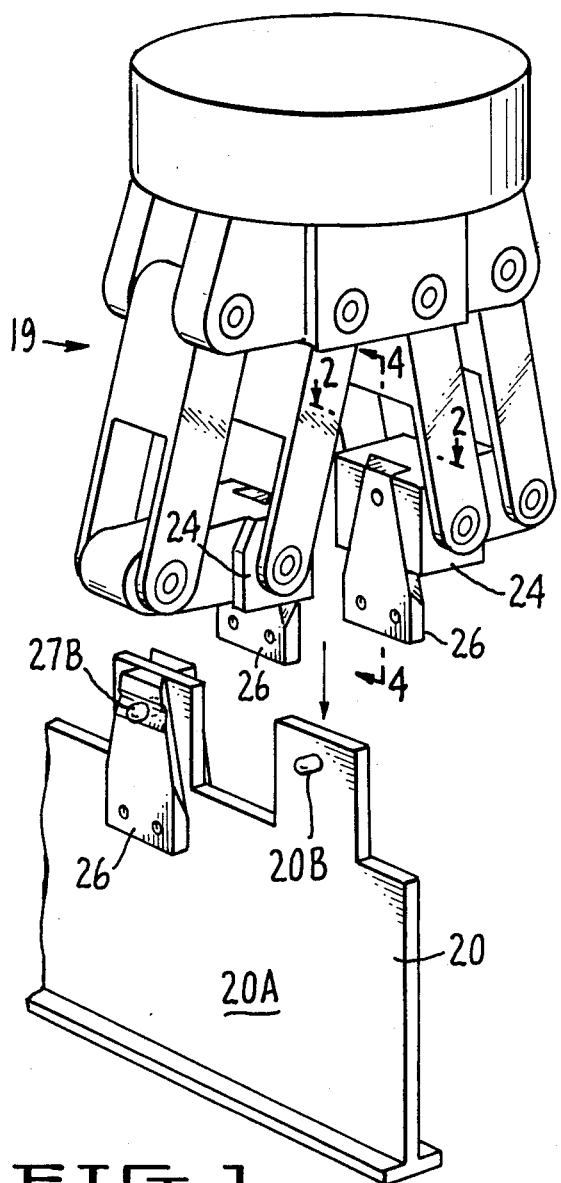
FIG. 1 is a perspective view of one embodiment of a coupling system according to the present invention.

Generally speaking, FIG. 1 shows a system which permits tools to be automatically coupled to, and uncoupled from, a robotic hand by simple movement of the robotic hand. The robotic hand, or "end effecter" is generally designated by the number 19. In the system shown, robotic hand 19 is a gripper of the two-fingered parallel jaw. As also shown in FIG. 1, a tool stand 20 is provided to store tools for use by robotic hand 19.

The purpose of tool stand 20 is to hold tools in a generally predetermined orientation both before the tools are coupled to the robotic hand and after the tools are uncoupled. Specifically, in the embodiment of FIG. 1, tool stand 20 comprises a vertically-disposed plate 20A which provides a plurality of tool storage and retrieval sites on both of its sides. In the illustrated embodiment, each storage and retrieval site is defined by a pin 20B which protrudes generally perpendicular from the plate 20A. As will be discussed in detail below, pins 20B serve to support the tools and also serve as mechanical operators during coupling and uncoupling operations. In the preferred embodiment, tool stand 20 has some compliance to allow for slight misalignment when coupling and uncoupling tools.

Figure 4:
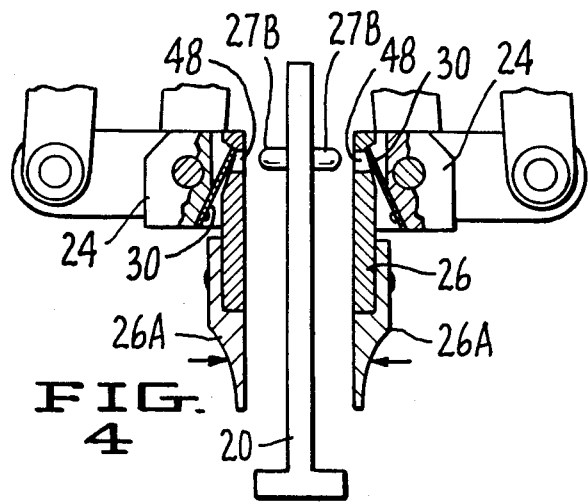
FIG. 4 is an elevational section taken along lines 4—4 in FIG. 1.
Figure 5:
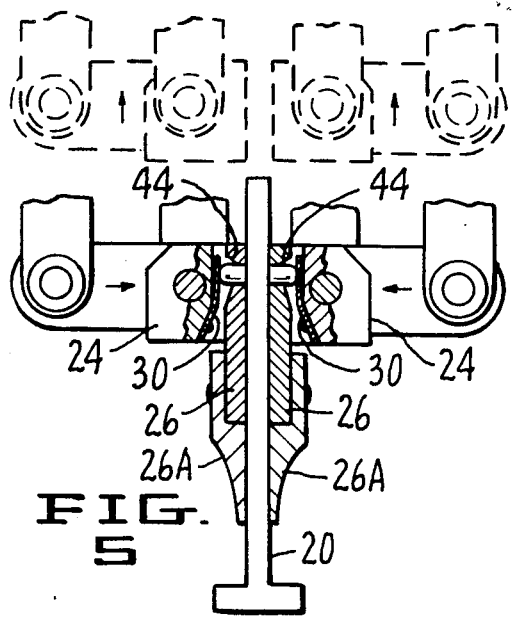
FIG. 5 is a view similar to FIG. 4 but showing components of the system of FIG. 1 in another position.

Again speaking generally, tool exchanging systems according to the present invention each include, as shown in FIG. 1, at least one component 24 referred to as a "finger block" and at least one component 26 referred to as a "finger blank". The finger blocks 24 function as receivers for finger blanks 26, and the finger blanks 26 carry application-specific tools as shown, for example, in FIGS. 4 and 5. The finger blocks 24 are connected integral with robotic hand 19, and the finger blanks 26 are detachably connected to each of the finger blocks.

Figure 2:
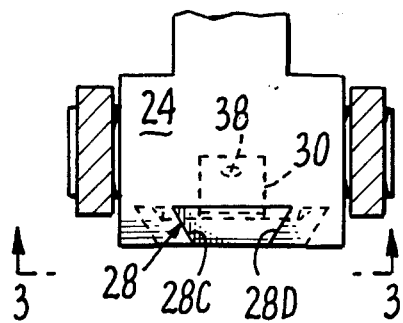
FIG. 2 is a fragmentary plan view of a portion of the system of FIG. 1 taken along lines 2—2 in FIG. 1 for viewing in the direction of the arrows.
Figure 3:
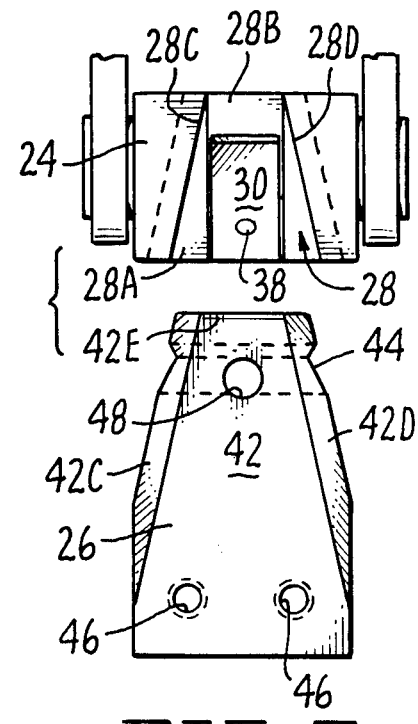
FIG. 3 is an exploded elevational view of a portion of the system of FIG. 1 taken along lines 3—3 in FIG. 2.

A decoupled finger block 24 and finger blank 26 are shown in FIG. 3. In this embodiment, finger block 24 has receiving groove 28 having a dovetail-like shape with a narrow upper end and a broader lower end. The base of receiving groove 28 comprises a generally planar surface 28A. In surface 28A is formed a secondary slot 28B. The sidewalls 28C and 28D of groove 28, as shown in FIG. 2, are not perpendicular to planar surface 28A but, instead, are angled such that the width of slot 28 increases toward planar surface 28A. Thus, groove 28 can be said to be double-like shape and the second taper is defined by angled sidewalls 28C and 28D.

As shown in FIG. 3, each finger blank 26 includes an end portion, generally designated by the number 42, having a double-tapered shape which is complementary to finger block groove 28. More particularly, end portion 42 has front and back planar faces which provide a dovetail-like outline. The side edges 42C and 42D of the portion 42 are angled, or beveled, to match the angles of sidewalls 28C and 28D of finger block groove 28. In practice, the upper edge 42E of end portion 42 is slightly bevelled as best shown in FIG. 9.

As shown in FIGS. 2 through 5, secondary slot 28B in finger block 24 contains a detent, or latching mechanism, for interactively coupling to finger blank 26. In the embodiment shown, the latching mechanism includes a flat leaf spring 30 having one end attached, as by fastener 38, within the lower portion of secondary slot 28B. The free end of spring 30 is located to move toward and away from planar surface 28A and, more particularly, is arranged to extend beyond planar surface 28A when relaxed while not protruding beyond secondary slot 28B when fully depressed.

As shown in FIGS. 3 and 9, a V-groove 44 is cut horizontally across the back face of end portion 42 of finger blank 26. The purpose of V-groove 44 is to provide an angled surface for engagement by the free end of spring 30 to ensure retention of finger blank 26 within finger block 24. It should be noted that V-groove 44 is intersected by a hole 48 which extends through end portion 42 of the finger blank. In practice, hole 48 has a sufficiently large diameter to accept pins 27B on tool stand 20 and, for that reason, can be called an "access" hole.

Operation of the above-described system to decouple a finger blank 26 from a finger block 24 will be described in conjunction with FIGS. 6, 7 and 8. Specifically, those figures illustrate a sequence of steps for decoupling a finger blank 26 from a finger block 24 and for placing the finger block onto tool stand 20. As the first step in the decoupling operation, shown in FIG. 6, robotic hand 19 positions a coupled finger blank 26 and finger block 24 such that access hole 48 is aligned with a pin 20B on tool stand 20. The robotic hand then moves the coupled finer block 24 and finger blank 26 laterally toward the tool stand. (When using a double-fingered parallel jaw gripper, it is convenient to accomplish the lateral motion by closing the jaws, thereby coupling or decoupling two finger blanks at the same time; such action is shown to the sequence in FIGS. 4 and 5.) As the lateral motion continues, the rear face of finger blank 26 moves into contact with the sidewall 20A of tool stand 20 and, simultaneously, pin 20B passes through access hole 48 and presses against the free end of spring 30, causing it to disengage the sidewall of V-groove 44. To complete the decoupling operation, as indicated in FIG. 8, finger block 24 is lifted vertically. During vertical movement, the free end of spring 30 moves upward past V-groove 44, leaving finger blank 26 hanging freely on pin 20B on tool stand 20. After a particular finger blank has been decoupled, the robotic hand is free to seek and couple to another finger blank and, hence, to another tool.

FIG. 9 shows, in larger detail, the spatial relationship of finger block 24 to finger blank 26 at the time of decoupling (or coupling). The deflected position of spring 40 is shown in phantom. It should be noted that the sidewall of V-groove 44 generally has an angle which is tangent to the path of travel of the free end of spring 30.

FIGS. 10, 11 and 12 illustrate steps for coupling a finger blank 26 to a finger block 24. Initially, it should be assumed that finger blank 26 hangs free from a pin 20B on tool stand 20. As the first step in the coupling procedure, shown in FIG. 10, finger block 24 is aligned vertically above finger blank 26 and then is moved downward to mate with, or capture, the finger blank. As finger block 24 is lowered, upper edge 42E of finger block 26 begins to compress the free end of spring 30 toward secondary slot 28B in finger block 24. As the finger block is lowered further, the projecting end of pin 20B forces the free end of spring 30 to bend sufficiently to fully enter secondary slot 28B. Thus, in its fully flexed position (FIG. 11), spring 30 avoids interference with the mating, or seating, of finger block 26 into double-tapered groove 28 of finger block 24. When finger blank 26 is fully seated in the double-tapered groove 28 but before coupling is completed, the free end of spring 30 rests against the end of pin 20B in front of V-groove 44. In the final coupling step, shown in FIG. 12, finger block 24 is moved laterally away from tool stand 20. During this movement, the free end of spring 30 progressively relaxes as pin 20B withdraws from access hole 48 until, finally, the free end of spring 30 abuttingly engages the sidewall of V-groove 44, at which time latching is complete.

When latching is complete, finger blank 26 cannot move independently of finger block 24. That is, upward movement of finger blank 26 relative to finger block 24 is constrained by the taper of dovetail-like groove 28, lateral and rotational movement of the finger blank 26 relative to the finger block is constrained by angled sidewalls 28C and 28D of the finger block, and independent downward movement of the finger blank is constrained by contact between the free end of spring 30 and the sidewall of V-groove 44. The latter constraint is best shown in FIG. 9, wherein it can be seen that leaf spring 30 is substantially straight (i.e., unflexed) as it engages the sidewall of V-groove 44.

It can be appreciated that the above-described tool exchanging system requires only motion of robotic hand 19 to accomplish coupling and decoupling of a finger block 24 to a finger blank 26. Specifically, the required robotic motion is generally only horizontal and vertical. In practice, such motion can be controlled by conventional microprocessor-based control systems with sufficient accuracy to accomplish coupling or decoupling of a finger block from a finger blank in a few seconds or less.

The self-aligning feature of the above-described embodiment can now be appreciated. Specifically, it can be understood that the double-tapered configuration of groove 28 allows coupling to be reliably accomplished despite misalignment between a finger block and a finger blank. Moreover, because of the generally dovetail-like shape of groove 28, precise vertical positioning of a finger block onto a finger blank is not required. That is, when a finger block 24 is moved vertically downward to seat onto a finger blank 26, seating is accomplished by wedge-like action of the double-tapered end 42 of the finger blank into the double-tapered groove in the finger block to provide a stop at the required location for latching. Still further, tool rack 20 allows finger blank 26 to pivot on actuator pins 20B and, thereby, to move to accommodate some misalignment during coupling and uncoupling.

FIGS. 13-16 illustrates an alternate embodiment of a coupling mechanism that permits a robotic hand to be readily coupled and uncoupled from application-specific tools. The mechanism in this embodiment is similar to the one described above and generally includes finger blocks 64 which are rigidly attached to a robotic hand (not shown) and which function to receive interchangeable finger blanks 66.

In this embodiment, each finger block 64 has the shape of a truncated solid cone, and each finger blank has the shape of a truncated hollow cone with an open end. The finger blanks 66 are dimensioned to mate with a finger block and are adapted to carry application-specific tools (not shown). Further in this embodiment, each finger block 64 has a vertical groove 64A formed along its sidewall and each finger blank 66 has an access hole 66A formed through its sidewall. Also, each finger blank 66 has a locating tab 66D extending from its larger end (FIG. 13) and each finger blank has a slot 64D formed in its sidewall to accept a locating tab 66D (FIG. 14).

The latching mechanism for coupling a finger blank 66 to a finger block 64 in this embodiment is generally similar to the latching mechanism in the previously described embodiment. Thus, the latching mechanism of FIGS. 15-16 includes a leaf spring 64B attached at its one end, as by fastener 64C, within the lower portion of groove 64A in the finger block. The 64B spring is arranged so that its free end protrudes upwardly and outwardly to engage the edge of an access hole 66A in a finger blank 66.

In the embodiment shown in FIG. 13, a tool stand 88 comprises a horizontal plate 88A that provides storage and retrieval sites 90 whereat finger blocks 66 are held in generally predetermined orientations. Each storage and retrieval site 90 is defined by a pin 96 which projects horizontally above the site. The function of each pin 96, like the function of pins 27B in the previously-described embodiment, is to provide a locating and actuating means for the above-described latching mechanism.

Also in the embodiment shown in FIG. 13, each storage site 90 includes a generally U-shaped seat defined by flanges 92. The purpose of flanges 92 is to engage complementary slots 94 formed on finger blanks 66. Tool stand 88 preferably provides dimensional compliance, as indicated by curved arrows in FIG. 13, to allow for misalignment when coupling a finger block 64 to a finger blank 66.

The steps involved in decoupling a finger blank 66 from a finger block 64 can be understood from FIGS. 13-16. As the first uncoupling step, as can be understood from FIG. 13, the robotic hand is operated to position a coupled finger blank 66 at a storage and retrieval site 90 so that the grooves 94 on the finger blank slides onto flanges 92 on tool stand 88. Then, as indicated in FIG. 15, finger blank 66 is moved laterally toward an actuator pin 96 so that the projecting end of the pin enters access hole 66A in the sidewall of the finger blank. Here again, when using a parallel-jaw gripper, it is convenient to couple or decouple two finger blanks at the same time, as indicated in FIG. 15. As the lateral decoupling motion continues, actuator pin 96 depresses the free end of spring 64B, thereby causing it to disengage the inner edge of hole 66A. To complete decoupling, as indicated in FIG. 16, finger block 64 is raised vertically while the finger blank 66 is held stationary on tool stand 88 by the constraining action of flanges 92.

Coupling of a finger blank 66 to a finger block 64 is accomplished by reversing the steps described above. A finger block which is completely coupled to a finger blank is shown in FIG. 14. Thus, when coupling is completed, the free end of spring 64B engages the edge of access hole 66A and, thereby, retains finger blank 66 on finger block 64 so that the finger blank 66 cannot move independently. More particularly, upward motion of a coupled finger blank is constrained by the taper of the frustoconical finger block, lateral displacement of the finger blank relative to the finger block is restrained by the sleeve-like engagement of the finger blank and finger block, independent downward motion of the finger blank from the finger block is constrained by the latching action of the free end of leaf spring 64B against the edge of the access hole 66A in finger blank, and rotation of the finger blank relative to the finger block is constrained by engagement between tab 66D and slot 64D.

It can be appreciated that the embodiment shown in FIGS. 13-16 also is self-aligning. Specifically, the complementary frustoconical shapes of finger blocks 64 and finger blanks 66 allow coupling to be accomplished even when there is some misalignment between a finger block and a finger blank. Also in this embodiment, precise control of vertical positioning of a finger blank is not required to accomplish coupling.

Although the present invention has been described with particular reference to the preferred embodiments, such disclosure should not be interpreted as limiting.

Various alternative embodiments and modifications will no doubt become apparent to those skilled in the art after having read the preceding disclosure. For example, it will be evident that various types of robotic hands, not just ones of the gripper type, can be used in the tool coupling system of the present invention. Also, it should be evident that the aforedescribed latching mechanism can have various embodiments. For example, the latching mechanism need not employ a leaf spring but, instead, would employ a coil spring which is mounted to engage a receiving aperture or the like in a finger blank. Thus, the appended claims are intended to encompass the above-discussed embodiments as well as equivalents thereof.

What is claimed is:

1. A system for exchangeably coupling tools to robotic hands comprising:
   tapered receiver means which are fixedly connected to robotic hands;
   complementary tapered means which are fixedly connected to tools and which are configured for generally self-centering mating with the tapered receiver means;
   latching means for latching the tapered receiver means to the complementary tapered means, the latching means each comprising a spring connected to the tapered receiver means and having an end which extends to engage the complementary tapered means; and
   aperture means formed in each of the complementary tapered means to permit an actuator to engage the spring via the aperture means.

2. A system according to claim 1 wherein the tapered receiver means comprises finger blocks and the complementary tapered means comprises finger blanks.

3. A system according to claim 2 wherein the finger blocks each have a dovetail-like receiving groove and the finger blanks each have an end having a complementary dovetail-like shape for seating within a dovetail-like groove in each finger block.

4. A system according to claim 2 wherein the sidewalls of the dovetail-like receiving grooves are angled to retain the finger blocks.

5. A system for selectively coupling and uncoupling a tool from a robotic hand such that the tool can be interchanged with another tool by motion only of the robotic hand, comprising:
   tool stand means for providing a plurality of tool storage and receiver sites;
   tapered receiver means fixedly connected to a robotic hand;
   complementary tapered means which are fixedly connected to tools and adapted to be self-centeringly received by the receiver means while being supported by the tool stand means in a generally predetermined orientation;
   latching means for selectively latching each of the complementary tapered means to each of the tapered receiver means through mechanical interaction with the tool stand means, the latching means each comprising a spring connected to the tapered receiver means and having an end which extends to engage the complementary tapered means;
   aperture means formed in each of the complementary tapered means to provide access to the extending end of the spring; and
   pin-like actuator means mounted at each of the storage and receiver sites on the tool stand means to engage the latching means via the aperture means for selectively disengaging a one of the receiver means from a one of the tapered means.

6. A system according to claim 5 wherein the complementary tapered means comprises finger blanks and the tapered receiver means comprises finger blocks for receiving the finger blanks.

7. A system according to claim 6 wherein each finger block has an open ended dovetail-like receiving groove formed therein, each finger blank includes an end portion having a complementary dovetail-like shape for seating within said dovetail-like groove in said finger block, and both the base and the sidewalls of the dovetail-like receiving grooves are tapered.

8. A system according to claim 6 wherein said tool stand means has dimensional compliance to accommodate misalignment of a said finger block and a said finger blank during coupling and uncoupling.

9. A system according to claim 8 wherein said tool stand means includes means for engaging and restraining vertical movement of a said finger blank.

10. A system for selectively coupling and uncoupling finger blocks from finger blanks on a robotic hand such that tools which are fixedly connected to the finger blanks can be interchangeably coupled to the robotic hand by motion only of the robotic hand, comprising:
    tool stand means including a plurality of tool storage and retrieval sites, each storage and retrieval site being defined by a stationary pin-like actuator member;
    tapered finger blanks adapted for fixed connection to tools and each having an aperture formed therein which permits the finger blank to be supported by a one of the stationary pin-like actuator members on the tool stand means;
    finger blocks adapted for fixed connection to a robotic hand and each having a receiving groove formed therein, each receiving groove having a dovetail-like shape whose broad end is open to self-centeringly receive the tapered end of ones of the finger blanks;
    a secondary slot formed in each of the receiving grooves;
    latching means for selectively latching ones of the finger blocks to ones of the finger blanks through mechanical interaction, the latching means each comprising a leaf spring for connection within one of the secondary slots such that one of the ends of the spring is free to engage a side of the finger blank received by the finger block; and
    an access aperture formed in each of the finger blanks to provide access to the latching means by one of the pin-like actuator members.

11. A system according to claim 10 wherein the tool stand means includes compliant means for providing the tool stand means with compliance to accommodate misalignment of a finger block and a finger blank during coupling and uncoupling of a tool.

* * * * *

UNITED STATES PATENT AND TRADEMARK OFFICE
CERTIFICATE OF CORRECTION

PATENT NO. : 4,852,242

DATED : August 1, 1989

INVENTOR(S) : Richard P. Tella, Stuart D. Lerner

It is certified that error appears in the above-identified patent and that said Letters Patent is hereby corrected as shown below:

Column 3, line 37 insert after "said to be double" --tapered; the first taper is defined by the dovetail- --.

Signed and Sealed this

Twenty-ninth Day of May, 1990

*Attest:*

HARRY F. MANBECK, JR.

*Attesting Officer*            *Commissioner of Patents and Trademarks*